(12) United States Patent
Künzel et al.

(10) Patent No.: US 8,840,986 B2
(45) Date of Patent: Sep. 23, 2014

(54) LAMINATE COATED WITH RADIATION-HARDENABLE PRINTING INK OR PRINTING LACQUER AND MOULDED PIECE

(75) Inventors: Roland Künzel, Leverkusen (DE); Klaus Meyer, Dormagen (DE); Norbert Kinzel, Köln (DE); Wolfgang Schäfer, Horb a N. (DE); Martin Hauck, Weil der Stedt (DE)

(73) Assignee: Bayer MaterialScience AG, Monheim (DE)

( * ) Notice: Subject to any disclaimer, the term of this patent is extended or adjusted under 35 U.S.C. 154(b) by 699 days.

(21) Appl. No.: 12/992,491

(22) PCT Filed: May 13, 2009

(86) PCT No.: PCT/EP2009/003390
§ 371 (c)(1),
(2), (4) Date: Dec. 28, 2010

(87) PCT Pub. No.: WO2009/138217
PCT Pub. Date: Nov. 19, 2009

(65) Prior Publication Data
US 2011/0117350 A1 May 19, 2011

(30) Foreign Application Priority Data
May 14, 2008 (DE) .......................... 10 2008 023 499

(51) Int. Cl.
B32B 7/02 (2006.01)
B32B 27/08 (2006.01)
B29C 45/14 (2006.01)
C09D 11/102 (2014.01)
C08J 7/04 (2006.01)
C09D 11/101 (2014.01)
C09D 169/00 (2006.01)
C09D 11/033 (2014.01)
C08L 33/00 (2006.01)

(52) U.S. Cl.
CPC ............... C09D 11/033 (2013.01); C08L 33/00 (2013.01); B29C 45/14688 (2013.01); C09D 11/102 (2013.01); C08J 7/047 (2013.01); C09D 11/101 (2013.01); C08J 2469/00 (2013.01); B29C 2045/14704 (2013.01); C09D 169/00 (2013.01)
USPC ........... 428/212; 428/220; 428/412; 427/256; 427/282

(58) Field of Classification Search
USPC .................. 428/212, 220, 412; 427/256, 282
See application file for complete search history.

(56) References Cited

U.S. PATENT DOCUMENTS

| | | | |
|---|---|---|---|
| 2,970,131 A | 1/1961 | Moyer, Jr. | |
| 2,991,273 A | 7/1961 | Hechelhammer et al. | |
| 2,999,835 A | 9/1961 | Goldberg | |
| 2,999,846 A | 9/1961 | Schnell et al. | |
| 3,028,365 A | 4/1962 | Schnell et al. | |
| 3,062,781 A | 11/1962 | Bottenbruch et al. | |
| 3,148,172 A | 9/1964 | Fox | |
| 3,271,367 A | 9/1966 | Schnell et al. | |
| 3,275,601 A | 9/1966 | Schnell et al. | |
| 4,368,231 A | 1/1983 | Egert et al. | |
| 4,707,396 A | 11/1987 | Wank et al. | |
| 5,126,428 A | 6/1992 | Freitag et al. | |
| 5,648,414 A | 7/1997 | Bier et al. | |
| 5,733,651 A | 3/1998 | Wank et al. | |
| 5,849,414 A * | 12/1998 | Bier et al. ...................... 428/412 |
| 8,404,333 B2 * | 3/2013 | Hagemann et al. ........... 428/204 |
| 2004/0152799 A1 | 8/2004 | Miller et al. | |
| 2006/0052477 A1 | 3/2006 | Kessel et al. | |
| 2006/0154030 A1 * | 7/2006 | Kastner et al. .............. 428/195.1 |

FOREIGN PATENT DOCUMENTS

| | | |
|---|---|---|
| DE | 1570703 | 2/1970 |
| DE | 2063050 | 7/1972 |
| DE | 2063052 | 7/1972 |
| DE | 2211956 | 10/1973 |
| DE | 2517032 | 10/1976 |
| DE | 2755088 | 6/1979 |
| DE | 3010143 | 7/1981 |
| DE | 3528812 | 2/1987 |
| EP | 0359953 | 3/1990 |
| EP | 0688839 | 12/1995 |
| EP | 0691201 | 1/1996 |
| FR | 1561518 | 3/1969 |
| GB | 1122003 | 7/1968 |
| GB | 1229482 | 4/1971 |
| GB | 1341318 | 12/1973 |
| GB | 1367788 | 9/1974 |
| GB | 1367790 | 9/1974 |

(Continued)

OTHER PUBLICATIONS

International Preliminary Report on Patentability and Written Opinion issued in PCT/EP2009/003390 on Nov. 17, 2010.

(Continued)

Primary Examiner — Aaron Austin
Assistant Examiner — Lawrence Ferguson
(74) Attorney, Agent, or Firm — Drinker Biddle & Reath LLP

(57) ABSTRACT

The present invention relates to printing ink or printing lacquer containing non radiation-hardenable polycarbonate, preferably, aromatic, in particular as a binder and adhesion promoting components. According to the invention, the polycarbonate is present with radiation-hardening monomers, in particular dissolved therein.

21 Claims, No Drawings

(56) References Cited

FOREIGN PATENT DOCUMENTS

| GB | 2370279 | 6/2002 |
| JP | 2004-067838 A | 3/2004 |
| JP | 2008-087248 A | 4/2008 |
| WO | WO-2004/092288 A1 | 10/2004 |
| WO | WO-2006/098676 | 9/2006 |

OTHER PUBLICATIONS

Bayer MaterialScience AG, *Application Technology Information Sheets ATI 7010 and AATI 7007*, Kunststoffe, issue Sep. 1999.
Schnell, H., *Chemistry and Physics of Polycarbonates* (1964), Interscience Publishers, New York.
Schnell, H., *Chemistry and Physics of Polycarbonates* (1964), Vol, IX, p. 33ff, Polymer Reviews, Interscience Publ.

* cited by examiner

LAMINATE COATED WITH RADIATION-HARDENABLE PRINTING INK OR PRINTING LACQUER AND MOULDED PIECE

CROSS-REFERENCE TO RELATED APPLICATIONS

This application is a national stage application (under 35 U.S.C. §371) of PCT/EP2009/003390, filed May 13, 2009, which claims benefit of German application 102008023499.0, filed May 14, 2008.

BACKGROUND OF THE INVENTION

The present invention relates to a laminate coated with a radiation-curing printing ink or printing varnish and a process for the production of such a laminate using such a printing varnish or such a printing ink. The invention also relates to a back-filled moulding containing such a laminate as well as a process for the production of such a moulding.

From the prior art, printing inks based on solid resins, in particular polycarbonate, are known, which are typically dissolved in halogen-free solvents. One printing ink of this type, referred to as the generic case, is described by EP 0 688 839 B1 which, in view of the polycarbonate described there, is to be incorporated in the present application as a possible embodiment of the binder belonging to the invention.

This printing ink known from the prior art is disadvantageous, however, in so far as the solvent-containing printing inks known from the prior art tend to dry in the screen by evaporation of the solvent, particularly after a certain down time without printing. This leads to screen blockage and additional cleaning is necessary. In the most unfavourable case, the screen becomes unusable as a result of this. Another disadvantage of this technology known from the prior art consists in the fact that the drying of the printing ink has to take place by hot air in a drying tunnel or oven; this leads to the processing being prolonged by the time necessary for drying and therefore it cannot be optimised as desired. Furthermore, the IR dryers used for thermal drying cause increased space and energy requirements, resulting in increased costs.

Also known from the prior art is a radiation-curing resin which is provided with reactive monomers that are also UV-curing. The associated GB 2 370 279 A describes a radiation-curing polyurethane acrylate with a polycarbonate component in the chemical structure which, however, exhibits disadvantages in processability. Particularly when printing on polycarbonate substrates, the problem of poor adhesion occurs in the so-called back-injection processes, i.e. in the processing technique in which a polycarbonate film printed using the printing ink is then back-injected again with a thermoplastic polymer on the printing side. Because the ink lies in a sandwich between the polycarbonate film and the injection moulded material, no abrasion of the film can take place in daily use. A further disadvantage of this prior art is the adhesion of the printed image to the mould during forming and the high pressure and temperature sensitivity of the printed image, which in turn leads to disadvantageous washout and therefore a poor printed image when back-injected.

The object of the present invention is therefore to create a laminate or a process for the production of a laminate with a printing ink, wherein the adhesion of the printing ink and/or of the printing varnish in relation to the substrate is improved and optimised. In particular, the need to use volatile solvents is ruled out so that undesirable drying in the screen during the printing process is prevented together with the necessary post-thinning with solvent and, as a result, the processing time is reduced. As a result, finer details can be printed and thus a higher print quality can be achieved. In the further processing step of back-injecting, a disadvantageous washout or impairments to the printed image can also be avoided.

BRIEF SUMMARY OF THE INVENTION

The object is achieved according to the invention by a laminate comprising
a) a substrate of at least one thermoplastic polymer, preferably a film of at least one thermoplastic polymer,
b) a single- or multi-layer ink film and/or varnish film of a printing ink or printing varnish, containing
as binder at least one non-radiation-curing aromatic polycarbonate based on a geminally disubstituted dihydroxydiphenyl cycloalkane, and
as solvent at least one radiation-curing monomer, which is selected from the group of acrylates, methacrylates, vinyl ethers and nitrogen-containing compounds with an ethylenic double bond,
characterised in that the binder is dissolved in the solvent and the solvent is bound in chemically crosslinked form in the printing ink or printing varnish after curing. Advantageous developments of the invention are described in the subclaims.

DETAILED DESCRIPTION OF THE INVENTION

In an advantageous way according to the invention, it was first surprisingly found that various radiation-curing monomers are first of all able to bring the thermoplastic polycarbonate resin into a stable solution and are then suitable for film formation with the same by means of UV curing. This is then exploited advantageously according to the invention so that the resulting printing ink and/or printing varnish does not dry in the screen during a screen printing process, and furthermore no disadvantageous post-thinning and/or cleaning of the screen after drying, or any similar effort, is necessary. Curing typically takes place preferably by UV radiation, LED curing or optionally with electron beam curing, with typical curing times of significantly less than 1 second leading to a very rapid complete cure of the liquid printing ink and/or printing varnish. After complete curing, the prints can be further processed directly without any additional temperature input, e.g. by a drying tunnel. This makes the processing time for printing performed in this way significantly shorter and increases productivity. It is also advantageous that, by avoiding any washout or similar, in combination with the best adhesion to the film substrate, fine details can be printed and thus broader fields of application potentially become accessible with the screen printing process.

In the context of the invention, the term "UV-curing" or "radiation-curing" is also to be understood as "crosslinking", which means that a complete cure of the ink film takes place through free-radical chain polymerisation. The difference between solvents conventionally used up to now in the prior art and the curable monomer used according to the invention, which is used as a dissolving medium for the polycarbonate resin, consists in the fact that the solvent is released into the air during the drying of the ink according to conventional understanding, whereas the curable monomers are or remain bound in the ink film. As a result, environmental pollution through VOCs (Volatile Organic Compounds), which can occur during the removal of the solvent during the drying of a solvent-based system, is avoided. At the same time, the significantly more compact UV-curing equipment requires significantly less space in the printing room. A further advantage of UV curing consists in the lower energy consumption compared with a drying tunnel, which is used for drying the solvent-based system.

The term "non-radiation-curing" in this context also means in particular the non-presence of a reactive double bond.

Radiation-curing printing inks can, like all printing inks and/or printing varnishes, contain many different components in addition to the binders contained according to the invention and must naturally be adapted to the respective application and the substrate being printed. The other components include e.g. pigments, fillers and auxiliary substances, which are usually required only in very small quantities but are often favourable for problem-free processing.

The thermoplastic, non-UV-curing polycarbonate resin, in combination with the typically non-volatile (or at best low-volatility) monomer, ensures that the ink is firmly anchored to a substrate (e.g. a polymer film) and thus the finished print favourably withstands stresses from abrasion, heat and mechanical bending as well as the conditions generally occurring during the back-injecting of the printed film. Owing to the non-volatility of the individual components of the printing ink, no post-thinning or similar is required as an additional process step during processing, as is necessary e.g. with halogen-free solvents from the prior art.

It is also advantageous that the polycarbonates used according to the invention are highly heat-resistant and very flexible, so that they are ideally suited for injection moulding operations or similar.

Particularly suitable for the practical implementation of the invention are the polycarbonates from Bayer MaterialScience AG known from the aforementioned EP 0 688 839 B1 although, deviating from the known prior art, these are present in solution in a UV-curing or radiation-curing monomer or mixture of curable monomers in the context of the present invention.

The ink film can be single- or multi-layer. In the case of a multi-layer ink film, several identical or different ink films may be applied one on top of the other. It may be preferable for the ink film to be multi-layer.

The present invention also provides a process for the production of the laminate according to the invention, characterised in that a substrate, in particular a film of a thermoplastic polymer, is coated with an ink film and/or a varnish film by printing, in particular screen printing, and then cured by radiation curing.

In preferred embodiments of the process according to the invention, the substrate can be formed before being coated with the ink film and/or varnish film or the laminate can be formed after coating the substrate with the ink film and/or varnish film. In the case of forming the laminate after coating the substrate with the ink film and/or varnish film, the laminate surprisingly displays no cracking in the ink film and no adhesion to the mould after forming.

The laminate according to the invention preferably has a total thickness of the substrate and the ink or varnish film of from 0.05 to 4 mm, particularly preferably from 0.1 mm to 2 mm, most particularly preferably from 0.2 to 2 mm. However, laminates with total film thicknesses of up to 20 mm, preferably of up to 19 mm, are also possible according to the invention.

A preferred embodiment of the invention consists in the production of a laminate—referred to below as a moulding—in such a way that a substrate printed with the printing ink according to the invention (laminate according to the invention) is processed to form the moulding by back-filling, e.g. by back-injecting, on the printing side with a (thermoplastic) polymer. In this way, a printed object with optimum protection against abrasion, in which the printed image is also optimised, can be produced in the manner stated above.

Accordingly, the present invention also provides a back-filled moulding, characterised in that a laminate according to the invention is back-filled one or more times with at least one thermoplastic polymer on the side printed with the printing ink or printing varnish, the thermoplastic polymer used for the back-filling having a temperature of 200° C. or more.

The laminate according to the invention can be back-filled with one or more layers of at least one thermoplastic polymer.

For further exemplary disclosure of a moulding of this type or of an object made thereof, reference is made in principle to the procedure according to EP 0 691 201 B1, particularly in terms of the layer structure, the substrate used and the other thermoplastic polymer, without being limited thereto.

Thus, exemplary structures of mouldings according to the invention are described by way of example in EP 0 691 201 B1—without being limited to these—and can contain 1. a preferably 0.02 mm to 0.8 mm thick, mono- or multi-layer film of thermoplastic polymer,
2. a mono- or multi-layer ink film preferably with a thickness of from 3 to 50 mm,
3. optionally at least one polyurethane layer which is tack-free at room temperature and
4. a back-filled thermoplastic polymer layer, preferably with a thickness of from 0.1 mm to 19 mm, which in turn consists of one or more polymer layers.

The thermoplastic polymer layer (4) can be applied here by back-filling of the layers 1+2 or 1+2+3 by known processes (cf. DE-OS 27 55 088).

Such mouldings of the layers 1+2+4 and optionally 3 can be obtained e.g. by coating films of thermoplastic polymers with at least one ink film and optionally with at least one polyurethane layer by screen printing and then, or before applying the polyurethane layer, forming them and finally back-filling with a thermoplastic polymer layer in a known manner. Composite films with polyurethane bonding are known in principle (DE-OS 25 17 032 and DE-AS 30 10 143).

The back-filling of thermoplastic polymer films with thermoplastic polymers by means of back-injecting is also known (DE-OS 27 55 088), as is the back-injecting of thermoplastic films with an intermediate ink film (DE-OS 35 28 812).

Suitable substrates and thermoplastic polymers for such mouldings are known to the person skilled in the art from EP 0 691 201 B1.

The essential advantage of the present invention lies in the fact that the printing ink used, for which the polycarbonate is dissolved in UV-curing monomers, permits the simple radiation curing, preferably UV curing, of the ink, better adhesion of the ink to the substrate to be printed, formability of this coated substrate without damaging the ink film and back-filling of such a coated substrate with thermoplastic polymers to be achieved without washout or destruction of the ink film.

The glass transition temperature of the ink, in particular the glass transition temperature of the polycarbonate used as binder in the ink, can be either below or above the glass transition temperature of the substrate. However, it may be advantageous for the glass transition temperature of the polycarbonate used as binder to be above the glass transition temperature of the substrate. The glass transition temperature is determined in accordance with ISO 11357.

The back-filled moulding is produced according to the invention by back-filling the laminate according to the invention one or more times with at least one thermoplastic polymer on the side printed with the printing ink or printing varnish at a temperature of 200° C. or higher.

The back-filling can take place e.g. by back-injection moulding, back-compression moulding or foam backing, preferably by back-injection moulding. These back-filling processes are known in principle to the person skilled in the art and are described in the literature (cf. e.g. DE-OS 27 55 088 or in Application Technology Information sheets ATI 7010 and ATI 7007 from Bayer MaterialScience AG (previously Bayer AG), which are available to the public and were published e.g. in the journal "Kunststoffe", issue 9/99).

In a most particularly preferred embodiment, the laminate according to the invention is coated on the side printed with the printing ink or printing varnish with a polyurethane layer by printing, particularly screen printing, and then back-filled with at least one thermoplastic polymer.

Other advantages, features and details of the present invention can be taken from the following description, including the structural formulae, formulations, procedures and parameters disclosed there. In the context of the present invention, these are considered to be disclosed in any combinations as belonging to the invention. To avoid repetitions, features disclosed in relation to substances are also to be considered as disclosed in relation to processes and as claimable. Similarly, features disclosed in relation to processes are also to be considered as disclosed in relation to substances and as claimable.

The printing process may be, for example, a screen printing, rotary screen printing, pad printing, offset printing, flexographic printing, gravure printing or inkjet printing process. It is preferably a screen printing process.

The curing of the ink is preferably carried out with UV light in a wavelength range of from 200 to 450 nm, which is sufficient to achieve a complete cure of the printing ink or printing varnish. Alternatively, the ink or varnish can also be cured without the use of photoinitiators by using electron beams. Hereinafter, therefore, where the term "UV-curing" is used, curing by means of other radiation, e.g. electron beams, should be read into this as an alternative. In addition, LED units which radiate almost monochromatic light in the UV light range or the range close to UV light can be used to dry the UV-curing ink.

The entire range of colours can be printed. When printing by screen printing, a 100-40 to 180-27, preferably 140-34 or 150-31, screen printing fabric is preferably used, which results in an ink film thickness of 5-12/μm. Curing takes place, depending on the printing task and printing machine, using commercial medium pressure mercury lamps or doped lamps with 80-400 W/cm, preferably 120 to 200 W/cm, which are substantially focused. The light exposure time is linked to the printing rate, since the printing and illuminating devices are linked. A conventional printing rate for printing the films is 1-50 prints/min.

Binders are required (e.g. for the abrasion-resistant decoration of injection mouldings by film insert moulding) which do not melt at the high temperatures of injection moulding and at the same time adhere firmly to the substrate and are flexible. These requirements are met by special high temperature resistant polycarbonates.

Preferably, therefore, high temperature resistant, flexible printing inks or varnishes are used which contain A) as binder at least one non-radiation-curing aromatic polycarbonate based on geminally disubstituted dihydroxydiphenyl cycloalkanes, and B) as solvent at least one radiation-curing monomer, which is selected from the group of acrylates, methacrylates, vinyl ethers and nitrogen-containing compounds with an ethylenic double bond, characterised in that the binder is dissolved in the solvent and the solvent is bound in the printing ink or printing varnish in chemically crosslinked form after curing.

Suitable polycarbonates are preferably high molecular weight, thermoplastic, aromatic polycarbonates with $M_w$ (weight average of the molecular weight) of at least 10 000, preferably from 20 000 to 300 000, which contain bifunctional carbonate structural units of formula (I),

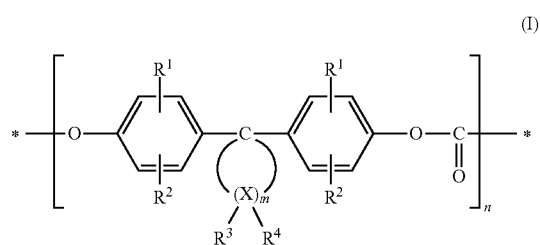

(I)

wherein $R^1$ and $R^2$ independently of one another signify hydrogen, halogen, preferably chlorine or bromine, $C_1$-$C_8$ alkyl, $C_5$-$C_6$ cycloalkyl, $C_6$-$C_{10}$ aryl, preferably phenyl, and $C_7$-$C_{12}$ aralkyl, preferably phenyl-$C_1$-$C_4$-alkyl, particularly benzyl, m signifies an integer of from 4 to 7, preferably 4 or 5, $R^3$ and $R^4$ may be selected for each X individually and, independently of one another, signify hydrogen or $C_1$-$C_6$ alkyl and X signifies carbon, and n signifies an integer of 30 or greater, particularly preferably an integer of from 50 to 900, most particularly preferably an integer of from 60 to 250, with the proviso that, on at least one X atom, $R^3$ and $R^4$ simultaneously signify alkyl.

Starting products for the polycarbonates are dihydroxydiphenyl cycloalkanes of the formula (Ia)

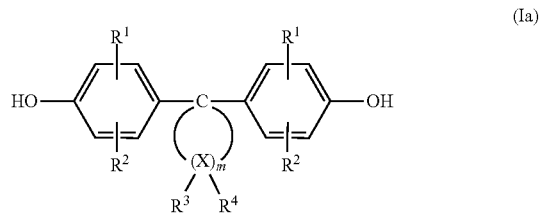

(Ia)

wherein

X, $R^1$, $R^2$, $R^3$, $R^4$, m and n have the meaning given for formula (I).

Preferably, $R^3$ and $R^4$ are simultaneously alkyl on one to two X atoms, particularly only on one X atom.

The preferred alkyl radical is methyl; the X atoms in alpha position to the diphenyl-substituted C atom (C-1) are preferably not dialkyl-substituted, however the alkyl disubstitution in beta position to C-1 is preferred.

Dihydroxydiphenyl cycloalkanes with 5 and 6 ring C atoms in the cycloaliphatic radical (m=4 or 5 in formula (Ia)), e.g. the diphenols of formulae (Ib) to (Id), are preferred,

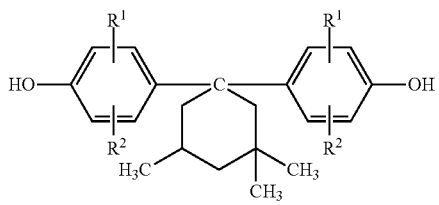

(Ib)

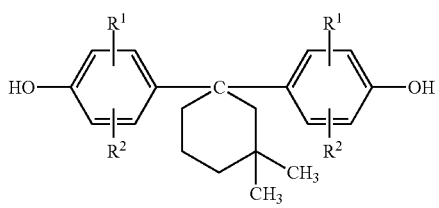

(Ic)

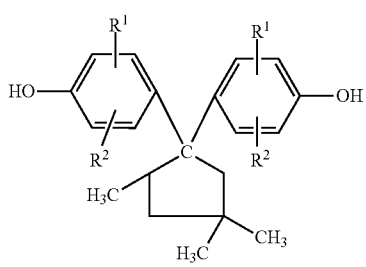

(Id)

wherein 1,1-bis(4-hydroxyphenyl)-3,3,5-trimethylcyclohexane (formula (Ib) with $R^1$ and $R^2$ equal to H) is particularly preferred. The polycarbonates can be produced in accordance with German patent application no. P 3 832 396.6 or EP-A 0 359 953 from diphenols of formula (Ia).

It is possible to use either one diphenol of formula (Ia) with the formation of homopolycarbonates or several diphenols of formula (Ia) with the formation of copolycarbonates.

In addition, the diphenols of formula (Ia) can also be used in a mixture with other diphenols, e.g. with those of formula (Ie)

HO—Z—OH       (Ie), for the production of high molecular weight, thermoplastic, aromatic polycarbonates.

Suitable other diphenols of formula (Ie) are those in which Z is an aromatic radical with 6 to 30 C atoms, which can contain one or more aromatic rings, can be substituted and can contain aliphatic radicals or cycloaliphatic radicals other than those of formula (Ia) or hetero atoms as bridge-type crosslinks.

Examples of the diphenols of formula (Ie) are: hydroquinone, resorcinol, dihydroxydiphenyls, bis(hydroxyphenyl)alkanes, bis(hydroxyphenyl)cycloalkanes, bis(hydroxyphenyl)sulfides, bis(hydroxyphenyl)ethers, bis(hydroxyphenyl)ketones, bis(hydroxyphenyl)sulfones, bis(hydroxyphenyl)sulfoxides, alpha,alpha'-bis(hydroxyphenyl)diisopropylbenzenes and the ring-alkylated and ring-halogenated compounds thereof.

These and other suitable diphenols are described e.g. in U.S. Pat. Nos. 3,028,365, 2,999,835, 3,148,172, 3,275,601, 2,991,273, 3,271,367, 3,062,781, 2,970,131 and 2,999,846, in DE-A 1 570 703, 2 063 050, 2 063 052, 2 211 956, Fr-A 1 561 518 and in the monograph "H. Schnell, Chemistry and Physics of Polycarbonates, Interscience Publishers, New York 1964".

Preferred other diphenols are e.g.: 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)cyclohexane, alpha,alpha-bis(4-hydroxyphenyl)-p-diisopropylbenzene, 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)cyclohexane, alpha, alpha-bis(3,5-dimethyl-4-hydroxyphenyl)-p-diisopropylbenzene, 2,2-bis(3,5-dichloro-4-hydroxyphenyl)propane and 2,2-bis(3,5-dibromo-4-hydroxyphenyl)propane.

Particularly preferred diphenols of formula (Ie) are e.g.: 2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane and 1,1-bis(4-hydroxyphenyl)cyclohexane.

In particular, 2,2-bis(4-hydroxyphenyl)propane is preferred. The other diphenols can be used either individually or in a mixture.

The molar ratio of diphenols of formula (Ia) to the other diphenols of formula (Ie) optionally also used should be between 100 mole % (Ia) to 0 mole % (Ie) and 2 mole % (Ia) to 98 mole % (Ie), preferably between 100 mole % (Ia) to 0 mole % (Ie) and 10 mole % (Ia) to 90 mole % (Ie) and particularly between 100 mole % (Ia) to 0 mole % (Ie) and 30 mole % (Ia) to 70 mole % (Ie).

The high molecular weight polycarbonates made from the diphenols of formula (Ia), optionally in combination with other diphenols, can be produced by the known polycarbonate production processes. The various diphenols in this case can be connected to one another either randomly or in blocks.

The polycarbonates according to the invention can be branched in a manner that is known per se. If branching is desired, it can be achieved in a known manner by incorporation by condensation of small quantities, preferably quantities of between 0.05 and 2.0 mole % (based on diphenols used), of trifunctional or more than trifunctional compounds, particularly those with three or more than three phenolic hydroxyl groups. Suitable branching agents with three or more than three phenolic hydroxyl groups are:

phloroglucinol, 4,6-dimethyl-2,4,6-tri-(4-hydroxyphenyl) heptene-2, 4,6-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenylmethane, 2,2-bis-[4,4-bis(4-hydroxyphenyl)cyclohexyl]propane, 2,4-bis(4-hydroxyphenylisopropyl)phenol, 2,6-bis(2-hydroxy-5-methylbenzyl)-4-methylphenol, 2-(4-hydroxyphenyl)-2-(2,4-dihydroxyphenyl)propane, hexa-[4-(4-hydroxyphenylisopropyl)phenyl]-orthoterephthalic acid ester, tetra-(4-hydroxyphenyl)methane, tetra-[4-(4-hydroxyphenylisopropyl)phenoxy]methane and 1,4-bis-[4',4''-dihydroxytriphenyl)methyl]benzene.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

As chain terminators for the regulation of the molecular weight of the polycarbonates, which is known per se, monofunctional compounds are used in conventional concentrates. Suitable compounds are e.g. phenol, tert.-butylphenols or other alkyl-substituted phenols. To regulate the molecular weight, small quantities of phenols of formula (If) are particularly suitable

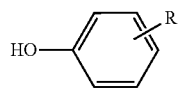
(If)

wherein
R represents a branched $C_8$ and/or $C_9$ alkyl radical.

The proportion of $CH_3$ protons in the alkyl radical R is preferably between 47 and 89% and the proportion of CH and $CH_2$ protons between 53 and 11%; it is also preferred for R to be in o- and/or p-position to the OH group, and particularly preferred for the upper limit of the ortho fraction to be 20%. The chain terminators are generally used in quantities of 0.5 to 10, preferably 1.5 to 8 mole %, based on diphenols used.

The polycarbonates can preferably be produced by the interfacial polycondensation process (cf. H. Schnell "Chemistry and Physics of Polycarbonates", Polymer Reviews, vol. IX, page 33ff., Interscience Publ. 1964) in a manner that is known per se.

In this process, the diphenols of formula (Ia) are dissolved in an aqueous alkaline phase. To produce copolycarbonates with other diphenols, mixtures of diphenols of formula (Ia) and the other diphenols, e.g. those of formula (Ie), are used. To regulate the molecular weight, chain terminators e.g. of formula (If) can be added. Then, in the presence of an inert organic phase, preferably one which dissolves polycarbonate, a reaction with phosgene is carried out by the interfacial polycondensation method. The reaction temperature is between 0° C. and 40° C.

The branching agents that are optionally also used (preferably 0.05 to 2.0 mole %) can either be initially present in the aqueous alkaline phase with the diphenols or added in solution in the organic solvent before phosgenation. In addition to the diphenols of formula (Ia) and optionally other diphenols (Ie), it is also possible to incorporate their mono- and/or bischlorocarbonates, these being added in solution in organic solvents. The quantity of chain terminators and branching agents then depends on the molar amount of diphenolate groups according to formula (Ia) and optionally formula (Ie); when chlorocarbonates are incorporated, the amount of phosgene can be reduced accordingly in a known manner.

Suitable organic solvents for the chain terminators and optionally for the branching agents and the chlorocarbonates are e.g. methylene chloride and chlorobenzene, particularly mixtures of methylene chloride and chlorobenzene. The chain terminators and branching agents used may optionally be dissolved in the same solvent.

Methylene chloride, chlorobenzene and mixtures of methylene chloride and chlorobenzene, for example, are used as the organic phase for the interfacial polycondensation.

NaOH solution, for example, is used as the aqueous alkaline phase. The production of the polycarbonates by the interfacial polycondensation process can be catalysed in a conventional manner by catalysts such as tertiary amines, particularly tertiary aliphatic amines such as tributylamine or triethylamine; the catalysts can be used in quantities of from 0.05 to 10 mole %, based on moles of diphenols used. The catalysts can be added before the beginning of phosgenation or during or even after phosgenation.

The polycarbonates can be produced by the known process in the homogeneous phase, the so-called "pyridine process", and by the known melt transesterification process using, for example, diphenyl carbonate instead of phosgene.

The polycarbonates preferably have a molecular weight $M_w$ (weight average, determined by gel permeation chromatography after previous calibration) of at least 10 000, particularly preferably from 20 000 to 300 000 and particularly from 20 000 to 80 000. They can be linear or branched and they are homopolycarbonates or copolycarbonates based on the diphenols of formula (Ia).

By means of the incorporation of the diphenols of formula (Ia), novel polycarbonates with high heat resistance have been created, which also have a good property profile in other respects. This is particularly true of the polycarbonates based on the diphenols of formula (Ia) in which m is 4 or 5, and most particularly for the polycarbonates based on the diphenols (Ib), wherein $R^1$ and $R^2$ independently of one another have the meaning given for formula (Ia) and are particularly preferably hydrogen.

The particularly preferred polycarbonates are therefore those in which structural units of formula (I) m=4 or 5, most particularly those of units of formula (Ig)

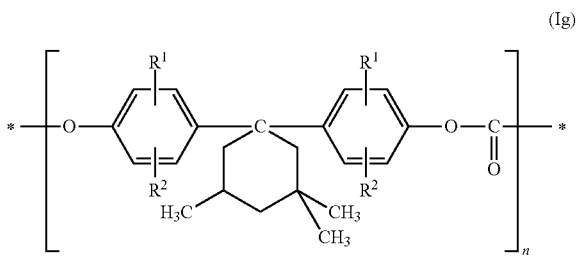
(Ig)

wherein $R^1$, $R^2$ and n have the meaning given for formula (I) but are particularly preferably hydrogen.

These polycarbonates based on the diphenols of formula (Ib), wherein in particular $R^1$ and $R^2$ are hydrogen, possess, in addition to their high heat resistance, good UV stability and good flow properties in the melt, which was not to be expected, and display very good solubility in the monomers mentioned below.

In addition, by means of composition with other diphenols as desired, particularly with those of formula (Ie), the polycarbonate properties can be favourably varied. In these copolycarbonates, the diphenols of formula (Ia) are contained in quantities of from 100 mole % to 2 mole %, preferably in quantities of from 100 mole % to 10 mole % and particularly in quantities of from 100 mole % to 30 mole %, based on the total quantity of 100 mole % of diphenol units, in polycarbonates.

Particularly preferred polycarbonates are copolycarbonates of formula (I-h), wherein the comonomers can be in an alternating, block or random arrangement in the copolymer, p+q=n and the ratio of q and p to one another behaves as reflected by the mole % data mentioned in the previous section for formulae (Ie) and (Ia).

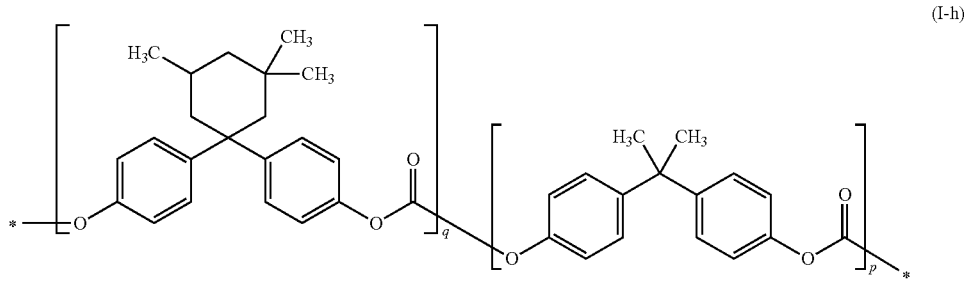

(I-h)

To produce the printing ink or printing varnish for the coating of the substrate with the ink or varnish film, the copolycarbonate used is dissolved in one or more UV-curing monomers, which are crosslinkable, e.g. on the basis of acrylate groups or ethylenically unsaturated groups suitable for polymerisation. These monomers are preferably monofunctional acrylates. However, di-, tri- or polyfunctional acrylates or methacrylates can also be used.

These UV-curing or radiation-curing monomers are used to dissolve the polycarbonate, but are based on a different principle compared with the solvents as used and understood e.g. in EP 0 688 839 B1. The solvents in the conventional sense, as used e.g. in EP 0 688 839 B1, serve exclusively to dissolve the polycarbonate. As a result of the subsequent drying of the ink, the solvents are intended to evaporate as completely as possible, i.e. almost 100%, and thus have no film-forming properties. In the present invention, however, crosslinkable monomers are used which are also intended to dissolve the polycarbonate but they remain in the ink, at best at a level of 100%, so that they have an important effect on the properties of the cured ink and a decisive influence on the film properties. The volatility of the radiation-curing monomers should preferably be less than 5%, most preferably less than 1%.

The following are examples of crosslinkable monomers that may be used, without being limited thereto: isobornyl (meth)acrylate (IBO(M)A), 2-phenylethyl(meth)acrylate (PE(M)A), ethoxylated 2-phenylethoxy acrylates, methoxylated polyethylene glycol mono(meth)acrylates, alkoxylated tetrahydrofurfuryl(meth)acrylate, alkoxylated lauryl acrylate, alkoxylated phenyl acrylate, stearyl(meth)acrylate, lauryl(meth)acrylate, isodecyl(meth)acrylate, isooctyl acrylate, octyl acrylate, tridecyl(meth)acrylate, caprolactone acrylate, ethoxylated or alkoxylated nonylphenol(meth)acrylate, cyclic trimethylolpropane formal acrylate, glycidyl methacrylate, propylene glycol monomethacrylate, 2-(2-ethoxyethoxy)ethyl acrylate (EOEOEA), methyl methacrylate (MMA), propoxylated allyl methacrylate, ethoxylated hydroxyethyl methacrylates, ethoxytriglycol methacrylate, 1,6-hexanediol di(meth)acrylate (HDD(M)A), alkoxylated hexanediol diacrylates, alkoxylated cyclohexanedimethanol di(meth)acrylates, 1,3-butylene glycol di(meth)acrylate, 1,4-butanediol di(meth)acrylate, diethylene glycol di(meth)acrylate, polyethylene glycol (200) diacrylate, polyethylene glycol (400) di(meth)acrylate, polyethylene glycol (600) di(meth)acrylate, ethoxylated bisphenol A di(meth)acrylates, tetraethylene glycol di(meth)acrylate, triethylene glycol di(meth)acrylate, ethylene glycol dimethacrylate, polyethylene glycol dimethacrylate, dipropylene glycol diacrylate (DPGDA), alkoxylated neopentyl glycol di(meth)acrylate, propoxylated trimethylolpropane triacrylate, trimethylolpropane tri(meth)acrylate, propoxylated glyceryl triacrylate (GPTA), dipentaerythritol hexaacrylate (DPHA), tripropylene glycol diacrylate (TPGDA), dipentaerythritol pentaacrylate (DiPEPA), pentaerythritol triacrylate (PETIA), (ethoxylated) pentaerythritol tetraacrylate, ditrimethylpropane tetraacrylate, trimethylpropane triacrylate (TMPEOTA), tricyclodecanedimethanol diacrylate (TCDDMDA), dipentaerythritol pentaacrylate, low molecular weight monofunctional urethane acrylates, low molecular weight epoxy acrylates, hydroxypropyl methacrylate (HPMA).

Most particularly preferred from the above list are 2-phenylethyl(meth)acrylate (PE(M)A), ethoxylated 2-phenylethoxy acrylates, tetrahydrofurfuryl methacrylate, 2-(2-ethoxyethoxy)ethyl acrylate (EOEOEA), methyl methacrylate (MMA) and 1,6-hexanediol diacrylate (HDDA).

Furthermore, various vinyl ethers can be used as crosslinkable monomers, such as e.g., without being limited thereto, diethylene glycol divinyl ether (DVE-2) or triethylene glycol divinyl ether (DVE-3).

Examples, without being limited thereto, of the compounds with an ethylenically unsaturated bond are N-vinylpyrrolidone (NVP), N-vinylcaprolactam, N-vinylformamide (NVF) or acryloylmorpholine (ACMO). For known health reasons, the use of N-vinylpyrrolidone (NVP) should be avoided as far as possible.

In general, one or more additional UV-curing or radiation-curing monomers are added to the binder for printing inks or varnishes. These UV-curing monomers, which are also cured, can be the UV-curing monomers mentioned above in connection with the copolycarbonate solution. The total quantity of UV-curing monomers is in general 1-99 wt. %, preferably 25 to 85 wt. %, particularly 50 to 85 wt. %.

The process of crosslinking the monomers takes place e.g. by UV curing, LED curing or electron beam curing. These are already known from the literature and are state of the art in various other applications, such as e.g. in the printing of optical storage media.

The radiation curing process can be combined with the process of the in-mould technique, especially the insert mould technique, by means of the present invention with its described advantages.

Preferably, no volatile organic solvent is added to the printing ink or printing varnish. Nevertheless, in exceptional cases volatile solvent can be added in order to optimise the printing ink or printing varnish for special applications. It is also possible for small quantities of solvents to be carried over into the ink through the addition of additives, since a large number of the active substances available on the market are dissolved in solvents or diluted with solvents. In the printing ink or printing varnish, no more than 10%, preferably no more than 5%, volatile organic solvents should be used. Particularly preferably, however, the use of volatile organic solvents is avoided.

Furthermore, the printing ink or printing varnish can contain at least one other resin in addition to the polycarbonate used.

The resins can be selected from a wide variety of resins. Examples are as follows, without being limited thereto: epoxy resins, polyester resins, cellulose resins, methyl methacrylate copolymers (e.g. Paraloid B-48N, Paraloid B60, Paraloid B-82 from Rohm & Haas Deutschland GmbH, In der Krön 4, D 60489 Frankfurt, Neocryl B-810 from Neoresins Lurgiallee 6-8, D-60439 Frankfurt/Main); ethyl methacrylate (e.g. Paraloid B 72 from Rohm & Haas); butyl methacrylate copolymers (e.g. Degalan LP 65/12, Degalan LP 68/04 from Röhm GmbH & Co KG, Kirschenallee); liquid epoxy resins (e.g. Polypox E 064 from UPPC AG, Schemmerbergerstr. 39, D-88487 Mietingen, Rütapox resin 0164 from Bakelite AG, Araldit GY 250 from Vantico); unsaturated polyester resins (e.g. Haftharz LTH from Degussa Chemiepark Mari, Paul-Baumann-Str. 1, 45764 Mari); saturated polyester resins (Dynapol L 912, Dynapol L 952 from Degussa). These additional resins can be present for example in a quantity of from 0 to 50 wt. % dry weight, based on the total mass of the ink or varnish, preferably from 0 to 20 wt. %, particularly preferably 0 to 5 wt. %, in order to optimise certain properties, such as e.g. adhesion. However, in relation to the quantity to be added of these additional passive or inert resins, which are chemically differentiated from the polycarbonate used as the main resin, it should be borne in mind that they generally reinforce the risk of washout of the ink during back-injecting.

The inks or varnishes preferably contain at least one photoinitiator, usually two and possibly three or more photoinitiators, in order to initiate the surface cure and in-depth cure (crosslinking) of the ink with UV-light. Photoinitiators with the lowest possible tendency towards migration and volatility are preferred, in order to avoid negative phenomena such as delamination of the ink from the injected material. In addition, the photoinitiators used should display the lowest possible tendency towards yellowing, so that the colour of the component is not modified and/or falsified.

They can be selected from the photoinitiators conventionally used in UV-curing printing inks and varnishes etc. For example, without being limited thereto, 1-hydroxycyclohexylacetophenone (Irgacure® 184 from Ciba Spezialitätenchemie AG, Klybeckstrasse 141, Postfach, CH-4002 Basle), 2-methyl-1-[4-(methylthiophenyl)-2-morpholinopropan]-1-one (Irgacure® 907 from Ciba), 2-hydroxy-1-[4-(2-hydroxyethoxy)phenyl]-2-methyl-1-propanone (Irgacure® 2959 from Ciba), α-dimethoxy-α-phenylacetophenone (Irgacure® 651 from Ciba), 2-benzyl-2-dimethylamino-1-(4-morpholinophenyl)butan-1-one (Irgacure® 369 from Ciba), bis(2,4,6-trimethylbenzoyl)phenyl phosphine oxide (Irgacure® 819 from Ciba), 2-hydroxy-2-methyl-1-phenyl-1-propanone (Darocur® 1173 from Ciba), isopropyl thioxanthone (ITX from Lambson), 2-chlorothioxanthone (CTX from Lambson), benzophenone, 2,4,6-trimethylbenzene diphenyl phosphine oxide (TPO from BASF), ethyl-2,4,6-trimethylbenzoylphenyl phosphinate (TPO-L from BASF) and methylbenzoyl formate (MBF from Lambson).

The quantity to be added is heavily dependent on the choice of printing process and the type of photoinitiators used.

The total quantity of photoinitiators is generally 1 to 20 wt. %, preferably 2 to 10 wt. %, particularly preferably 3-7%, based on the total mass of the printing ink or printing varnish.

In addition, it is also possible to use co-initiators such as amines (e.g. MDEA from BASF Aktiengesellschaft, Carl-Bosch-Straβe 38, 67056 Ludwigshafen) or amine-modified acrylates (e.g. Ebecryl P115, Ebecryl 7100 from Surface Specialities UCB; Actilane 705, Actilane 715, Actilane 755 from Akzo Nobel Resins bv., Verkaufsbüro Deutschland, Industriestr. 8. 46446 Emmerich; Laromer PO 94 F, Laromer LR 8869 from BASF; Craynor503, Craynor 550 from Cray Valley; Photomer 4775F from Cognis) in quantities of from 0.5 to 20 wt. %, based on the total mass of the printing ink or printing varnish depending on the printing process and the type of photoinitiators used.

Bis(2,4,6-trimethylbenzoyl)phenyl phosphine oxide (Irgacure® 819 from Ciba), 2-hydroxy-2-methyl-1-phenyl-1-propanone (Darocur® 1173 from Ciba) and trimethylbenzene diphenyl phosphine oxide (TPO from BASF) are preferably used.

A thickener can also be contained in the printing ink or varnish and can also be selected from conventional materials used for this purpose in printing inks and/or printing varnishes. These include, for example, without being limited thereto, pyrogenic silica, structurally modified layered silicates post-treated with methacryl silane and castor oil derivatives as well as solutions of modified ureas or polyhydroxycarboxamides. The quantity of thickener(s) used is usually in the range of from 0 to 10 wt. %, preferably 0.5 to 5 wt. % and particularly 1.5 to 3 wt. %, based on the total mass of the printing ink or printing varnish.

In general, the printing ink or varnish also contains a defoamer and/or a flow control agent.

Defoamers can, for example, without being limited thereto, be selected from modified acrylates or modified acrylate copolymers, but also from silicone-containing compounds. Flow control agents include, for example, modified polyacrylates and polysiloxanes.

In general, but depending on the printing process and the type of defoamers and/or flow control agents used, they are employed in a quantity of from 0.1 to 2.5 wt. %, based on the total mass of the printing ink or varnish.

Among the defoamers and flow control agents, it is preferred to use silicone-free products to prevent migration of these compounds and the possible resulting delamination of the injected material from the ink.

As stabilisers it is preferable to use, without being limited thereto, Genorad 16 from Rahn and Fluorstab UV2 from Kromachem, 10, Park Industrial Centre, Tolpits Lane, Watford, Hertfordshire WD1 8SP, UK.

The printing ink or printing varnish can comprise one or more fillers. These fillers are used to reduce the price and to optimise the flow properties of the printing ink and/or printing varnish.

The nature of the fillers is not particularly critical. They can be selected from conventional fillers used in printing inks, such as, for example, without being limited thereto, china clay, barium sulfate (in precipitated form as blanc fixe), calcium carbonate, zinc sulfide, silica, talcum, aluminum silicate, aluminum hydroxide and/or silicic acid. The quantity of filler used is generally in the range of from 0 to 50 wt. %, preferably 0 to 30 wt. %, e.g. 20 wt. %, based on the total mass of the printing ink or varnish.

The pigments preferably contained in the printing ink can be any pigments. It is possible to use, for example, without being limited thereto, titanium dioxide, zinc sulfide, carbon black, azo diaryl yellow, isoindole yellow, diarylide orange, quinacridone magenta, diketo pyrrolo red, copper phthalocyanine blue, copper phthalocyanine green, dioxazine violet and diketo metal oxide.

A fairly comprehensive list of other pigments that can be used is to be found in the Colour Index International, Fourth Edition Online, 2001, published by the Society of Dyers and Colourists in conjunction with the American Association of Textile Chemists and Colorists.

Special effect pigments, such as, but without being limited to, metal oxide coated mica and metallic pigments, can also be used. The quantity of colour pigment is generally 1 to 50 wt. %, preferably 3 to 45 wt. %, based on the weight of the printing ink, depending on the type of pigment, the desired hiding power and the printing process selected. White pigment is generally used in a quantity of from 20 to 50 wt. %, preferably 25 to 45 wt. %. The coloured pigments are generally used in a quantity of from 1 to 20 wt. %, depending on the nature and on the shade as well as on the printing process employed.

Metal oxide coated mica and metallic pigments are generally used in a quantity of from 1 to 20 wt. %, depending on the nature and on the shade as well as on the printing process employed.

All pigments used must be highly thermally stable and must not be destroyed, sublimate or change their shade as a result of the temperature arising during back-injecting.

To improve the ink properties, it is additionally possible to add waxes. Suitable waxes are commercially available. The waxes listed below are particularly suitable, commercially available products being named as examples of the respective waxes; the respective source of supply is given in brackets:

Polyethylene waxes:
Ceraflour 990 (Byk-Cera; Danzigweg 23; 7418 EN Deventer Netherlands), Ceraflour 991 (Byk-Cera; Danzigweg 23; 7418 EN Deventer Netherlands), Printwax ME 0825 (Deurex Micro-Technologies GmbH; Dr. Bergius Strasse 18/20; 06729 Tröglitz Germany)

Modified polyethylene waxes:
Ceraflour 961 (Byk-Cera; Danzigweg 23; 7418 EN Deventer Netherlands), Everglide UV 961 25% (Krahn-Chemie GmbH; Grimm 10; 20457 Hamburg Germany)

High-density polyethylene waxes:
Ceraflour 950 (Byk-Cera; Danzigweg 23; 7418 EN Deventer Netherlands)

Polymer-silica composites:
Deuteron MM 659 (Deuteron GmbH; in den Ellern 2; 28832 Achim Germany)

Micronised polyolefin waxes:
Micro Wax DM (Finma-Chemie GmbH, Theodor-Heuss-Strasse 5; 61191 Rosbach Germany), Micro Wax HTDM (Finma-Chemie GmbH, Theodor-Heuss-Strasse 5; 61191 Rosbach Germany)

Fischer-Tropsch waxes:
Ceraflour 940 (Byk-Cera; Danzigweg 23; 7418 EN Deventer Netherlands)

Micronised polytetrafluoroethylene waxes:
Ceraflour 980 (Byk-Cera; Danzigweg 23; 7418 EN Deventer Netherlands), Ultraglide UV 701 (Krahn-Chemie GmbH; Grimm 10; 20457 Hamburg Germany), Shamrock ST-3 (Shamrock; Heesterveldweg 21; 3700 Tongeren Belgium)

Micronised polytetrafluoroethylene/polyethylene waxes:
Ceraflour 968 (Byk-Cera, Danzigweg 23; 7418 EN Deventer Netherlands), Ceraflour 996 (Byk-Cera; Danzigweg 23; 7418 EN Deventer Netherlands)

Amide waxes:
Ceraflour 994 (Byk-Cera; Danzigweg 23; 7418 EN Deventer Netherlands), Deurex MA 7020 (Deurex Micro-Technologies GmbH; Dr. Bergius Strasse 18/20; 06729 Tröglitz Germany)

Carnauba waxes:
Ceraflour 4RC 1165 (Byk-Cera; Danzigweg 23; 7418 EN Deventer Netherlands), Everglide UV 636 25% (Krahn-Chemie GmbH; Grimm 10; 20457 Hamburg Germany)

Montan waxes:
Deurex MM 8120 (Deurex Micro-Technologies GmbH; Dr. Bergius. Strasse 18/20; 06729 Tröglitz Germany), Deurex MM 8200 (Deurex Micro-Technologies GmbH; Dr. Bergius Strasse 18/20; 06729 Tröglitz Germany)

Micronised ester waxes with UV-reactive groups:
Ceridust TP 5091 (Clariant GmbH; Am Unisyspark 1; 65843 Sulzbach Germany)

Paraffin waxes:
Polyspers HP (Eastman Chemical Deutschland GmbH; Charlottenstrasse 61; 5114 9 Cologne Germany)

Polypropylene waxes:
Crayvallack WN-1135 (Lubrizol Coating Additives GmbH; Max Planck Strasse 6; 27721 Ritterhude Germany)

Spray-micronised polyolefin waxes:
Printwax MXF 9510 D (Deurex Micro-Technologies GmbH; Dr. Bergius Strasse 18/20; 06729 Tröglitz Germany), Printwax MX. 9815 D (Deurex Micro-Technologies GmbH; Dr. Bergius Strasse 18/20; 06729 Tröglitz Germany)

The concentration of the wax is preferably 0 wt. % to 10 wt. %, more preferably 0 wt. % to 3.0 wt. % and particularly preferably 0-2 wt. %, based on the weight of the printing ink or printing varnish.

Before printing, an adhesion promoter may be added to the printing ink or varnish in a quantity of from 0.01 to 20 wt. %, preferably 1 to 10 wt. %, based on the weight of the ink or varnish for printing. This can be an isocyanate adhesion promoter, e.g. aliphatic polyisocyanates such as hexamethylene diisocyanate (HDI), trimethylhexane diisocyanate (TMHDI), cycloaliphatic polyisocyanates such as isophorone diisocyanate (IPDI), hydrogenated xylylene diisocyanate (HXDI) or diisocyanatodicyclohexylmethane (HMDI), as well as aromatic polyisocyanates, such as toluene diisocyanate (TDI), xylylene diisocyanate (XDI), tetramethylxylylene diisocyanate (TMXDI) or diisocyanatodiphenylmethane (MDI). Commercially available products are e.g. Desmodur E41 or Desmodur N 75 (Bayer). Polyimides, such as polyethylene imides or polycarbodiimides, can also be used. Other adhesion promoters are silane adhesion promoters, such as alkyl silanes, vinyl silanes, methacryloxy silanes, epoxy silanes, amino silanes, urea silanes, chlorosilanes and isocyanatosilanes as well as aminosilanes, such as e.g. gamma-aminopropyltriethoxysilane, gamma-aminopropyltrimethoxysilane, N-beta-(aminoethyl)-gamma-aminopropyltrimethoxysilane, bis(gamma-trimethoxysilylpropyl)amine, N-phenyl-gamma-aminopropyltrimethoxysilane and N-beta-(aminoethyl)-gamma-aminopropylmethyldimethoxysilane, and isocyanatosilanes, such as gamma-isocyanatopropyl triethoxysilane.

Preferred printing processes are screen printing, rotary screen printing, digital printing, flexographic printing, letterpress printing, offset printing and gravure printing. Screen printing is particularly preferably used.

Particularly suitable thermoplastic polymers for the substrates to be coated with the printing ink or printing varnish and/or for back-filling the laminate according to the invention are polycarbonates or copolycarbonates based on diphenols, poly- or copolyacrylates and poly- or copolymethacrylates such as, for example and preferably, polymethyl methacrylate (PMMA), polymers or copolymers with styrene such as, for example and preferably, polystyrene (PS) or polystyrene-acrylonitrile (SAN) or acrylonitrile-butadiene-polystyrene (ABS), thermoplastic polyurethanes, as well as polyolefins such as, for example and preferably, polypropylene grades or polyolefins based on cyclic olefins (e.g. TOPAS®, Hoechst), poly- or copolycondensates of terephthalic acid, such as, for example and preferably, poly- or copolyethylene terephthalate (PET or CoPET), glycol-modified PET (PETG), glycol-modified poly- or copolycyclohexane dimethylene terephthalate (PCTG) or poly- or copolybutylene terephthalate (PBT or CoPET), poly- or copolycondensates of naphthalenedicarboxylic acid such as, for example and preferably, polyethylene glycol naphthalate (PEN), poly- or copolycondensate(s) of at least one cycloalkyl dicarboxylic acid, such as, for example and preferably, polycyclohexanedimethanolcyclohexanedicarboxylic acid (PCCD), polysulfones (PSU) or mixtures of the aforementioned.

Preferred thermoplastic polymers are polycarbonates or copolycarbonates or blends containing at least one polycarbonate or copolycarbonate. Particularly preferred are blends containing at least one polycarbonate or copolycarbonate and at least one poly- or copolycondensate of terephthalic acid, naphthalenedicarboxylic acid or a cycloalkyl dicarboxylic acid, preferably cyclohexanedicarboxylic acid. Most particularly preferred are polycarbonates or copolycarbonates, particularly with average molecular weights $M_w$ of from 500 to 100 000, preferably from 10 000 to 80 000, particularly preferably from 15 000 to 40 000 or blends thereof with at least one poly- or copolycondensate of terephthalic acid with average molecular weights $M_w$ of from 10 000 to 200 000, preferably from 26 000 to 120 000.

Common substrates consisting of at least one thermoplastic polymer that can be printed with the printing ink or printing varnish include, inter alia, polycarbonate, pretreated polyester, ABS, PMMA, polycarbonate/polyester blends and polycarbonate/ABS blends, without being limited thereto.

Examples of suitable substrates are single- or multi-layer substrates. Multi-layer substrates can contain several polymer layers and/or a polymer layer and a coating of other materials. Suitable examples of multi-layer substrates are e.g. coextruded films or laminates containing one or more of the aforementioned thermoplastic polymers as well as coated films containing one or more of the aforementioned thermoplastic polymers.

Suitable films are available e.g. from Bayer MaterialScience AG (Bayfol®, Makrolon®, Makrofol®, Bayblend®) and Autotype (Autoflex Hiform™, Autoflex XtraForm™). It is preferred to use films of polycarbonate or polycarbonate/polyester blends as substrate.

The common injection moulding materials that can be used for back-injecting the printing ink or printing varnish that have been applied on to the film are, in particular but not exclusively, polyesters, polycarbonates, polycarbonate blends, polystyrene, ABS, ABS blends, polyamide, PVC and PMMA. The preferred material for back-injecting is polycarbonate or various polycarbonate blends.

The following examples are intended to provide an exemplary explanation of the invention and are not to be construed as a restriction.

Exemplary Embodiments

Production of Polycarbonates Suitable as Binders According to the Invention:

Examples of polycarbonates of formula (I-h) were produced as follows:

Polycarbonate 1

205.7 g (0.90 mol) bisphenol A (2,2-bis(4-hydroxyphenyl)propane), 30.7 g (0.10 mol) 1,1-bis(4-hydroxyphenyl)-3,3,5-trimethylcyclohexane, 336.6 g (6 mol) KOH and 2700 g water are dissolved in an inert gas atmosphere with stirring. A solution of 1.88 g phenol in 2500 ml methylene chloride is then added. 198 g (2 mol) of phosgene were introduced into the solution, which was stirred well, at pH 13 to 14 and 21 to 25° C. Next, 1 ml ethylpiperidine is added and stirring is continued for a further 45 min. The bisphenolate-free aqueous phase is separated off and the organic phase, after acidifying with phosphoric acid, is washed with water until neutral and freed of the solvent. The polycarbonate had a relative solution viscosity of 1.255.

The glass transition temperature of the polymer was determined as 157° C. (DSC).

Polycarbonate 2

As for polycarbonate 1, a mixture of 181.4 g (0.79 mol) bisphenol A and 63.7 g (0.21 mol) 1,1-bis(4-hydroxyphenyl)-3,3,5-trimethylcyclohexane was reacted to give polycarbonate.

The polycarbonate had a relative solution viscosity of 1.263.

The glass transition temperature of the polymer was determined as 167° C. (DSC).

Polycarbonate 3

As for polycarbonate 1, a mixture of 149.0 g (0.65 mol) bisphenol A and 107.9 g (0.35 mol) 1,1-bis(4-hydroxyphenyl)-3,3,5-trimethylcyclohexane was reacted to give polycarbonate.

The polycarbonate had a relative solution viscosity of 1.263.

The glass transition temperature of the polymer was determined as 183° C. (DSC).

Polycarbonate 4

As for polycarbonate 1, a mixture of 91.6 g (0.40 mol) bisphenol A and 185.9 g (0.60 mol) 1,1-bis(4-hydroxyphenyl)-3,3,5-trimethylcyclohexane was reacted to give polycarbonate.

The polycarbonate had a relative solution viscosity of 1.251.

The glass transition temperature of the polymer was determined as 204° C. (DSC).

Polycarbonate 5

As for polycarbonate 1, a mixture of 44.2 g (0.19 mol) bisphenol A and 250.4 g (0.81 mol) 1,1-bis(4-hydroxyphenyl)-3,3,5-trimethylcyclohexane was reacted to give polycarbonate.

The polycarbonate had a relative solution viscosity of 1.248.

The glass transition temperature of the polymer was determined as 216° C. (DSC).

The glass transition temperatures were determined by DSC (Differential Scanning Calorimetry) in accordance with ISO 11357. To determine the glass transition temperatures, the samples were previously dried for 24 hours in a vacuum cabinet.

Production of the Screen Printing Inks used According to the Invention:

To illustrate the invention, screen printing inks were produced as follows:

For this purpose, 20 wt. % of the binder from Bayer Material Science (polycarbonate 4, see above) was initially dissolved in 80 wt. % UV-curing monomer 4-(1-oxo-2-propenyl)morpholine. Additional monofunctional acrylates, a diacrylate, photoinitiators, flow control agents, thickeners and pigments were added to the binder dissolved in UV-curing monomer 4-(1-oxo-2-propenyl)morpholine, predispersed using a high-speed mixer and, with the aid of a triple roll mill or a bead mill, an ink was produced with a fineness of grain of <10 μm.

The invention is described by examples 1 and 2 listed in tables 1 and 2, without being limited thereto.

EXAMPLE 1

According to the Invention

Blue Ink for Screen Printing

TABLE 1

| Raw material | Wt. % |
| --- | --- |
| Polycarbonate 4 (20 wt. %) in 4-(1-oxo-2-propenyl)morpholine (80 wt. %) | 72.00 |
| 1-Ethenylazepan-2-one | 4.66 |
| 2-Phenoxyethyl acrylate (Sartomer SR339EU) | 6.44 |
| Tricyclodecanedimethanol diacrylate (Sartomer SR833S) | 5.00 |
| Polysiloxane (flow control agent) | 1.00 |
| Phenyl bis(2,4,6-trimethylbenzoyl)phosphine oxide (photoinitiator) | 0.90 |
| 2-Hydroxy-2-methyl-1-phenyl-1-propanone (photoinitiator) | 5.00 |
| Modified urea solution (thickener) | 1.00 |
| Sunfast blue 15:3 249-1532 (pigment) | 4.00 |

EXAMPLE 2

According to the Invention

White Ink for Screen Printing

TABLE 2

| Raw material | Wt. % |
| --- | --- |
| Polycarbonate 4 (20 wt. %) in 4-(1-oxo-2-propenyl)morpholine (80 wt. %) | 27.90 |
| 1-Ethenylazepan-2-one | 7.60 |
| 2-Phenoxyethyl acrylate (Sartomer SR339EU) | 10.50 |
| 4-(1-Oxo-2-propenyl)morpholine | 1.10 |
| Tricyclodecanedimethanol diacrylate (Sartomer SR833S) | 5.00 |
| Polysiloxane (flow control agent) | 1.00 |
| Phenyl bis(2,4,6-trimethylbenzoyl)phosphine oxide (photoinitiator) | 0.90 |
| 2-Hydroxy-2-methyl-1-phenyl-1-propanone (photoinitiator) | 5.00 |
| Modified urea solution (thickener) | 1.00 |
| Tiona 595 (pigment) | 40.00 |

To produce the laminates according to the invention, the screen printing inks from examples 1 and 2 with a viscosity of approx. 4 000 mPa*s (cone-plate system with a shear rate of 100/s) were each printed through a 150-31 screen printing fabric on to a polycarbonate film (Makrofol® DE-4; 375 μm; Bayer MaterialScience AG) and cured at a rate of 15 m/min with the aid of 2×120 W/cm mercury vapour lamps.

EXAMPLE 3

According to the Invention

Blue Ink for Screen Printing

In the production of another screen printing ink, 30 wt. % of the binder from Bayer Material Science (polycarbonate 5, see above) was dissolved in 70 wt. % UV-curing monomer 4-(1-oxo-2-propenyl)morpholine.

A diacrylate, photoinitiators, flow control agents, thickeners and pigment were added to the binder dissolved in UV-curing monomer 4-(1-oxo-2-propenyl)morpholine, predispersed using a high-speed mixer and, with the aid of a triple roll mill or a bead mill, an ink was produced with a fineness of grain of <10 μm.

The invention is described by the example presented in table 3, without being limited thereto.

TABLE 3

| Raw material | Wt. % |
| --- | --- |
| Polycarbonate 5 (30 wt. %) in 4-(1-oxo-2-propenyl)morpholine (70 wt. %) | 52.50 |
| 4-(1-Oxo-2-propenyl)morpholine | 25.60 |
| Tricyclodecanedimethanol diacrylate (Sartomer SR833S) | 10.00 |
| Polysiloxane (flow control agent) | 1.00 |
| Phenyl bis(2,4,6-trimethylbenzoyl)phosphine oxide (photoinitiator) | 0.90 |
| 2-Hydroxy-2-methyl-1-phenyl-1-propanone (photoinitiator) | 5.00 |
| Modified urea solution (thickener) | 1.00 |
| Sunfast blue 15:3 249-1532 (pigment) | 4.00 |

The screen printing ink with a viscosity of approx. 4 000 mPa·s (cone-plate system with a shear rate of 100/s) was printed through a 150-31 screen printing fabric on to a polycarbonate film (Makrofol® DE-4; 375 μm; Bayer MaterialScience AG) and cured at a rate of 15 m/min with the aid of 2×120 W/cm mercury vapour lamps.

The following examples 4 to 7 were carried out for comparison purposes:

COMPARATIVE EXAMPLE 4

UV Ink for Graphic Screen Printing

A commercially available screen printing ink with the composition according to table 4, which contained a polyacrylate as binder, was printed on to a polycarbonate film (Makrofol® DE-4; 375 μm, Bayer MaterialScience AG) and cured as described for examples 1 and 2.

TABLE 4

| UV ink for graphic screen printing | |
| --- | --- |
| Raw material | Wt. % |
| MMA copolymer | 17.50 |
| 1-Ethenylazepan-2-one | 9.00 |
| Isobornyl acrylate | 35.00 |
| 2-Phenoxyethyl acrylate (Sartomer SR339EU) | 6.00 |
| Polysiloxane (flow control agent) | 1.00 |
| 2-Hydroxy-2-methyl-1-phenyl-1-propanone (photoinitiator) | 3.50 |
| 2-Benzyl-2-(dimethylamino)-1-[4-(4-morpholinyl)-1-butanone (photoinitiator) | 2.00 |
| Isopropyl thioxanthone (photoinitiator) | 0.70 |
| Diphenyl(2,4,6-trimethylbenzoyl)phosphine oxide (photoinitiator) | 1.30 |
| Sunfast blue 15:3 249-1532 (pigment) | 4.00 |
| Barium sulfate (Sachtleben Blanc Fixe micro) | 20.00 |

COMPARATIVE EXAMPLE 5

UV Ink for Graphic Screen Printing

A commercially available screen printing ink with the composition according to table 5, which contained a different polyacrylate from the one in comparative example 4 as binder, was printed on to a polycarbonate film (Makrofol® DE-4; 375 μm, Bayer MaterialScience AG) and cured as described for examples 1 and 2.

TABLE 5

| UV ink for graphic screen printing | |
|---|---|
| Raw material | Wt. % |
| MMA copolymer | 24.00 |
| 1,6-Hexanediol diacrylate (Sartomer SR238) | 23.00 |
| Isobornyl acrylate | 12.00 |
| 2-Phenoxyethyl acrylate (Sartomer SR339EU) | 15.00 |
| Polysiloxane (flow control agent) | 1.00 |
| Phenyl bis(2,4,6-trimethylbenzoyl)phosphine oxide (photoinitiator) | 0.90 |
| 1-Hydroxycyclohexyl phenyl ketone (photoinitiator) | 7.00 |
| Sunfast blue 15:3 249-1532 (pigment) | 4.00 |
| Barium sulfate (Blanc Fixe micro) | 13.10 |

COMPARATIVE EXAMPLE 6

UV Ink for Graphic Screen Printing

A commercially available screen printing ink with the composition according to table 6, which contained a polyurethane acrylate as binder, was printed on to a polycarbonate film (Makrofol® DE-4; 375 μm, Bayer MaterialScience AG) and cured as described for examples 1 and 2.

TABLE 6

| UV ink for graphic screen printing | |
|---|---|
| Raw material | Wt. % |
| Polyurethane acrylate | 46.00 |
| 1-Ethenylazepan-2-one | 9.00 |
| Isobornyl acrylate | 22.00 |
| Polysiloxane (flow control agent) | 1.00 |
| Isopropyl thioxanthone (photoinitiator) | 1.00 |
| 2-Methyl-1-[4-(methylthio)phenyl]-2-(morpholinyl)-1-propanone (photoinitiator) | 2.00 |
| Sunfast blue 15:3 249-1532 | 4.00 |
| Barium sulfate (Blanc Fixe micro) | 15.00 |

COMPARATIVE EXAMPLE 7

UV Ink for the In-mould Process

A commercially available screen printing ink from Coates (Decomold™), which contained as binder a copolymer with an aliphatic polycarbonate backbone and oligomeric urethane acrylate side chains, was printed on to a polycarbonate film (Makrofol® DE-4; 375 μm, Bayer MaterialScience AG) and cured as described for examples 1 and 2.

EXAMPLE 8

Results of the Forming Tests

The coated films (laminates) produced according to examples 1 to 7 were tested for their formability as described below.

The forming tests were performed on an SAMK 360 high pressure forming machine (HPF machine), year of construction 2000, from Niebling. For the evaluation of the forming properties, the tests were performed with a heating/ventilation panel mould. The dimensions of the component were approx. 190×120 mm with various apertures for the stretch to be evaluated.

The mould temperature was 100° C. Before forming, the films were preheated in a heating zone. The heating time was 16 seconds for all the tests, which gave a film temperature of approx. 150-160° C. For the evaluation, 5 films from each of the examples were formed consecutively.

The evaluation was performed visually and the results compiled in table 7.

TABLE 7

| Example | HPF | Stretch | Evaluation (forming/stretch) |
|---|---|---|---|
| No. 1 | Ok | Ok | +/+ |
| No. 2 | Ok | Ok | +/− |
| No. 3 | Ok | Ok | +/+ |
| No. 4 | Ok | Ok | +/+ |
| No. 5 | Ok | Cracks | +/− |
| No. 6 | Ok | Severe cracks | +/− |
| No. 7 | Adheres at 80° C. | Ok | −/+ |

The results showed that, apart from the laminates according to the invention, only the laminate from comparative example 4 could be formed and stretched without damaging the laminate overall or the ink film.

EXAMPLE 9

Results of the Back-injection Tests

The films (laminates) produced and coated according to examples 1 to 7 and formed according to example 8 were tested for their back-injection characteristics as described below. For evaluation in the film insert moulding process (FIM), the same films could be used as in the forming test.

The tests were performed using an injection moulding machine from Arburg. The Arburg Allrounder 570 C has a locking force of max. 200 tonnes and was constructed in 2003. The various films were back-injected with PC/ABS at 260° C. The mould filling time was 2 seconds and the injection pressure was measured as 1000 bar. The mould temperature was set to a standard value of 60° C. The mould has a hot tip which feeds the polymer into the mould cavity through a cold runner via auxiliary pins. During this process, high temperatures and shear forces occur, which can in some cases wash out the printed ink when the stress is too high.

The adhesion of the back-injected plastic to the ink was then evaluated in a manual pull-off test.

The evaluation was carried out visually and the results compiled in table 8.

TABLE 8

| Example | Washout | Adhesion | Evaluation (washout/adhesion) |
|---|---|---|---|
| No. 1 | none | good | +/+ |
| No. 2 | none | good | +/+ |
| No. 3 | none | good | +/+ |
| No. 4 | marked washout | none | −/− |
| No. 5 | none | low | +/− |
| No. 6 | none | none | +/− |
| No. 7 | none | none | +/− |

The results showed that only the laminates according to the invention could be back-injected with a thermoplastic both without washout of the ink film and with good adhesion between laminate and back-injected material.

EXAMPLE 10

Results of Climatic Testing

In order to obtain a more extensive evaluation regarding adhesion between printed film (laminate) and the back-injection material, the mouldings from example 9 were exposed to ageing under climatically controlled conditions. These tests were performed in a climatic test cabinet from Weiss, year of construction 1989, under the following conditions:
Temperature: 80° C.
Atmospheric humidity: 85%
Storage period: 100 hours.
The films were then evaluated visually and also subjected to a manual pull-off test. The results are listed in table 9.

TABLE 9

| Example | Appearance | Adhesion | Evaluation (appearance/adhesion) |
|---|---|---|---|
| No. 1 | ok | good | +/+ |
| No. 2 | ok | good | +/+ |
| No. 3 | ok | good | +/+ |
| No. 4* | not tested | not tested | none |
| No. 5 | marked blisters | none | −/− |
| No. 6 | marked blisters | none | −/− |
| No. 7 | blisters | none | −/− |

The results showed that only the laminates according to the invention still exhibited a good appearance and good adhesion after ageing under climatically controlled conditions. The comparative examples exhibited blistering and no longer displayed any adhesion.

*The laminates according to comparative example 4 were no longer tested after ageing under climatically controlled conditions since the results according to example 9 were already too poor for subsequent long-term ageing under climatically controlled conditions.

Overall Evaluation:
Taking into consideration the results of examples 8-10, i.e. for the entire process chain of the forming and back-injecting of the printed films (laminates), the following overall picture was obtained for the examples:

TABLE 10

| Example | Forming | Back-injection | Ageing under climatically controlled conditions | Evaluation |
|---|---|---|---|---|
| No. 1 | ok | ok | ok | + |
| No. 2 | slight cracks | ok | ok | + |
| No. 3 | ok | ok | ok | + |
| No. 4 | ok | washout | not tested | − |
| No. 5 | cracks | low adhesion | blisters | − |
| No. 6 | cracks | no adhesion | blisters | − |
| No. 7 | adheres | no adhesion | blisters | − |

For the laminates according to the invention from examples 1 to 3, good formability, stretchability during this forming and back-injectability were observed. The adhesion of the back-injection material with the printed film (the laminate according to the invention) was good both immediately after the back-injection and after storage in the conditioning cabinet and in addition, no washout of the ink whatsoever could be observed. The comparative examples 4 to 7 in some cases already displayed significant weaknesses during forming, in terms of significant cracking in the ink film or adhesion of the overall laminate to the forming mould. During back-injection and ageing under climatically controlled conditions, all the comparative examples displayed either marked washout of the ink from the ink film or inadequate to no adhesion between coated film and back-injection material.

EXAMPLE 11

In table 11, further examples of suitable inks in a blue shade for various printing processes were listed, without being limited thereto.

TABLE 11

Examples of blue inks for various printing processes

| Raw material | Screen printing | Rotary screen printing | Flexographic printing | Digital printing |
|---|---|---|---|---|
| Polycarbonate 4 (30%) in 4-(1-oxo-2-propenyl)morpholine (70%) | | 31.00 | 15.40 | 5.00 |
| Polycarbonate 5 (35%) in 4-(1-oxo-2-propenyl)morpholine (65%) | 41.00 | | | |
| Aliphatic diacrylate (80%) in dipropylene glycol diacrylate (20%) | | | | 5.00 |
| 4-(1-Oxo-2-propenyl)morpholine | | 4.00 | 8.60 | 23.00 |
| 1-Ethenylazepan-2-one | 18.00 | 16.00 | 15.50 | 19.00 |
| 2-Phenoxyethyl acrylate (SR339EU) | 24.10 | 22.00 | 21.00 | 26.00 |
| 1,6-Hexanediol diacrylate | 5.00 | 5.00 | 5.00 | 5.00 |
| Polysiloxane | 1.00 | | | 0.10 |
| Acrylated defoamer silicone-free | | 2.50 | 2.50 | |
| Solsperse 5000 | | 0.10 | 0.40 | 0.05 |
| Solsperse 39000 | | 0.40 | 1.60 | 0.20 |
| Modified urea solution | 1.00 | | | |
| 2-Hydroxy-2-methyl-1-phenyl-1-propanone | 5.00 | 7.50 | 7.50 | |
| 1-Hydroxycyclohexyl phenyl ketone | | | | 7.50 |
| Diphenyl(2,4,6-trimethylbenzoyl)phosphine oxide | | 7.50 | 7.50 | 7.50 |
| Phenyl bis(2,4,6-trimethylbenzoyl)phosphine oxide | 0.90 | | | |
| Sunfast blue 15:3 249-1532 | 4.00 | 4.00 | | |
| Hostaperm Blau B2G | | | 15.00 | 1.65 |

The invention claimed is:
1. A laminate comprising:
   a) a substrate comprising a thermoplastic polymer,
   b) a single- or multi-layer ink film and/or varnish film comprising a printing ink or a printing varnish, comprising
      i) a binder comprising a non-radiation-curing aromatic polycarbonate based on a geminally disubstituted dihydroxydiphenyl cycloalkane, and
      ii) a solvent comprising at least one radiation-curing monomer, which is selected from the group consisting of acrylates, methacrylates, vinyl ethers and nitrogen-containing compounds with an ethylenic double bond,
   wherein the binder is dissolved in the solvent and the solvent is bound in chemically crosslinked form in the printing ink or printing varnish after curing,
   wherein the glass transition temperature of the polycarbonate used as the binder in the ink film or varnish film $T_{g(binder)}$ is higher than the glass transition temperature of the substrate $T_{g(substrate)}$.
2. The laminate according to claim 1, wherein the substrate is a film comprising a thermoplastic polymer.
3. The laminate according to claim 1, wherein the thermoplastic polymer of the substrate is one or more polycarbonate(s) or copolycarhonate(s) based on diphenols, poly- or copolyacrylates(s) and poly- or copolymethacrylate(s), poly- or copolymer(s) with styrene, poly- or copolycondensate(s) of terephthalic acid, of naphthalenedicarboxylic acid or of a cycloalkyl dicarboxylic acid, polyurethane(s), polyolefin(s) or combinations thereof.

4. The laminate according to claim 1, wherein the overall thickness of the substrate and the ink film or varnish film is 0.05 to 4 mm.

5. The laminate according to claim 1, wherein the substrate comprises one or more polymer layers and/or the ink film or varnish film comprises one or more layers.

6. The laminate according to claim 1, wherein the polycarbonate in the binder of the printing ink or printing varnish has a molecular weight $M_w$ (weight average) of at least 10000 and/or comprises a bifunctional carbonate structural unit of formula (I),

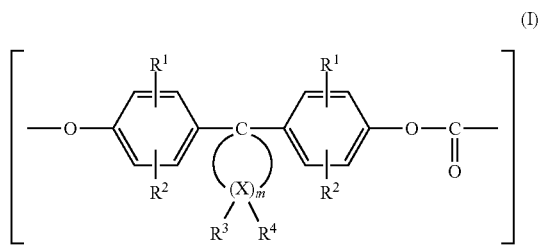

wherein
$R^1$ and $R^2$ are, independently of one another, hydrogen, halogen, $C_1$-$C_8$ alkyl, $C_5$-$C_6$ cycloalkyl, or $C_6$-$C_{10}$ aralkyl;
m is an integer of from 4 to 7;
$R^3$ and $R^4$ may be selected for each X individually and, independently of one another, are hydrogen or $C_1$-$C_6$ alkyl; and
X is carbon;
with the proviso that, on at least one X atom, $R^3$ and $R^4$ simultaneously signify alkyl.

7. The laminate according to claim 6, wherein the polycarbonate comprises at least 30 mole % of the bifunctional carbonate structural unit of formula (I), based on the amount of substance of all bifunctional carbonate structural units.

8. The laminate according to claim 1, wherein the radiation-cured printing ink or printing varnish has a softening point of less than 144° C.

9. The laminate according to claim 1, wherein the laminate is obtained by forming.

10. A back-filled moulding comprising the laminate according to claim 1, and a back-filling which comprises a thermoplastic polymer, wherein the back-filling is positioned on the side printed with the printing ink and/or printing varnish, and wherein the moulding is back-filled at a temperature of 200° C. or more.

11. The back-filled moulding according to claim 10, wherein the back-filling comprises one or more layers of at least one thermoplastic polymer.

12. A process for the production of a back-filled moulding which comprises back-filling the laminate according to claim 1 one or more times with at least one thermoplastic polymer on the side printed with the printing ink and/or printing varnish at a temperature of 200° C. or more.

13. The process according to claim 12, wherein the back-filling takes place by back-injection moulding, back-compression moulding or foam backing.

14. The process according to claim 12, wherein the laminate is coated with a polyurethane layer by printing, on the side printed with the printing ink or printing varnish and then back-filled with at least one thermoplastic polymer.

15. The process according to claim 14, wherein the laminate is coated with the polyurethane by screen printing.

16. A process for the production of a laminate which comprises:
a) providing a substrate which comprises a thermoplastic polymer;
b) printing an ink film and/or varnish film to the substrate, wherein the ink film and/or the varnish film comprises a printing ink or printing varnish, comprising
1) a binder comprising a non-radiation-curing aromatic polycarbonate based on a geminally disubstituted dihydroxydiphenyl cycloalkane, and
2) a solvent comprising at least one radiation-curing monomer, which is selected from the group consisting of acrylates, methacrylates, vinyl ethers and nitrogen-containing compounds with an ethylenic double bond,
wherein the binder is dissolved in the solvent and the solvent is bound in chemically crosslinked form in the printing ink or printing varnish after curing, and
wherein the glass transition temperature of the polycarbonate used as the binder in the film or varnish film $T_{g(binder)}$ is higher that the glass transition temperature of the substrate $T_{g(substrate)}$;
c) curing the substrate after applying the ink film and/or varnish film.

17. The process according to claim 16, wherein the ink film and/or the varnish film is printed by screen printing.

18. The process according to claim 16, wherein the substrate is formed before being coated with the ink film and/or varnish film.

19. The process according to claim 16, wherein the laminate is formed after coating the substrate with the ink film and/or varnish film.

20. A laminate comprising:
a) a substrate comprising a thermoplastic polymer,
b) a single- or multi-layer ink film and/or varnish film comprising a printing ink or a printing varnish, comprising
i) a binder comprising a non-radiation-curing aromatic polycarbonate based on a geminaily disubstituted dihydroxydiphenyl cycloalkane, and
ii) a solvent comprising at least one radiation-curing monomer, which is selected from the group consisting of acrylates, methacrylates, vinyl ethers and nitrogen-containing compounds with an ethylenic double bond,
wherein the binder is dissolved in the solvent and the solvent is bound in chemically crosslinked form in the printing ink or printing varnish after curing,
wherein the polycarbonate in the binder of the printing ink or printing varnish has a molecular weight $M_w$ (weight average) of at least 10000 and/or comprises a bifunctional carbonate structural unit of formula (I),

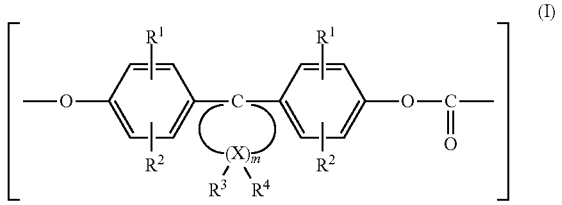

wherein
R¹ and R² are, independently of one another, hydrogen, halogen, $C_1$-$C_8$ alkyl, $C_5$-$C_6$ cycloalkyl, or $C_6$-$C_{10}$ aralkyl;
m is an integer of from 4 to 7;
R³ and R⁴ may be selected for each X individually and independently of one another, are hydrogen or $C_1$-$C_6$ alkyl; and
X is carbon;
with the proviso that, on at least one X atom, R³ and R⁴ simultaneously signify alkyl,
and wherein the polycarbonate comprises at least 30 mole % of the bifunctional carbonate structural unit of formula (I), based on the amount of substance of all bifunctional carbonate structural units.

21. A laminate comprising:
a) a substrate comprising a thermoplastic polymer,
b) a single- or multi-layer ink film and/or varnish film comprising a printing ink or a printing varnish, comprising
  i) a binder comprising a non-radiation-curing aromatic polycarbonate based on a geminally disubstituted dihydroxydiphenyl cycloalkane, and
  ii) a solvent comprising at least one radiation-curing monomer, which is selected from the group consisting of acrylates, methacrylates, vinyl ethers and nitrogen-containing compounds with an ethylenic double bond,
wherein the binder is dissolved in the solvent and the solvent is bound in chemically crosslinked form in the printing ink or printing varnish after curing, and
wherein the radiation-cured printing ink or printing varnish has a softening point of less than 144° C.

* * * * *